(12) United States Patent
Johnson

(10) Patent No.: US 7,951,347 B2
(45) Date of Patent: May 31, 2011

(54) SOUR-GAS SWEETENING SOLUTIONS AND METHODS

(75) Inventor: Marvin Johnson, Bartlesville, OK (US)

(73) Assignee: Novum Energy Technology, LLC, Salt Lake City, UT (US)

( * ) Notice: Subject to any disclaimer, the term of this patent is extended or adjusted under 35 U.S.C. 154(b) by 0 days.

(21) Appl. No.: 12/438,350

(22) PCT Filed: Sep. 1, 2007

(86) PCT No.: PCT/US2007/019139
§ 371 (c)(1),
(2), (4) Date: Mar. 17, 2010

(87) PCT Pub. No.: WO2008/027510
PCT Pub. Date: Mar. 6, 2008

(65) Prior Publication Data
US 2010/0186589 A1 Jul. 29, 2010

Related U.S. Application Data

(60) Provisional application No. 60/842,071, filed on Sep. 1, 2006.

(51) Int. Cl.
*B01D 53/40* (2006.01)
*B01D 53/52* (2006.01)
*B01D 53/62* (2006.01)
*C09K 3/00* (2006.01)
*C23F 11/00* (2006.01)
*C23F 11/18* (2006.01)

(52) U.S. Cl. ....... 423/220; 423/228; 423/229; 48/127.3; 48/127.5; 252/182.11; 252/182.12; 252/182.29; 252/182.3; 422/7; 422/12; 422/13

(58) Field of Classification Search .................. 48/127.3, 48/127.5; 252/182.11, 182.12, 182.29, 182.3; 422/7, 12, 13; 423/220, 228, 229
See application file for complete search history.

(56) References Cited

U.S. PATENT DOCUMENTS

| | | |
|---|---|---|
| 2,826,516 A | 3/1958 | Froning et al. |
| 4,372,873 A | 2/1983 | Nieh |
| 5,342,578 A | 8/1994 | Agrawal et al. |
| 5,846,503 A | 12/1998 | Yan |
| 6,585,933 B1 | 7/2003 | Ehrhardt et al. |
| 2009/0205496 A1* | 8/2009 | Idem et al. ............ 95/236 |

OTHER PUBLICATIONS

"Corrosion of Iron Equipment from Carbon Dioxide Absorption in Monoethanolamine," Preda, *Revistade Chimie* (1967).
English abstract of "Corrosion of Iron Equipment from Carbon Dioxide Absorption in Monoethanolamine," Preda, *Revistade Chimie* (1967). "Protection of Equipment for Acidic Gas Scrubbing by Corrosion Inhibitors," Bartonicek, *Chemicky Prumysal* (1962).
English abstract of "Protection of Equipment for Acidic Gas Scrubbing by Corrosion Inhibitors," Bartonicek, *Chemicicy Prumysal* (1962).
Notification of Transmittal of the International Search Report and the Written Opinion of the International Searching Authority, or the Declaration mailed Jun. 17, 2008, 10 pages.

* cited by examiner

*Primary Examiner* — Timothy C Vanoy
(74) *Attorney, Agent, or Firm* — Davis Wright Tremaine LLP

(57) ABSTRACT

A sour gas sweetening solution comprises an aqueous solution of a silicon-containing compound and an amine-containing compound. The silicon-containing compound is preferably maintained at a concentration less than or equal to 500 parts per million ("ppm") more preferably less than or equal to 400 ppm, and most preferably between about 100 ppm and 300 ppm as $SiO_2$. The silicon-containing compound can be $M_xSi_yO_z$, wherein "M" is a metal and "x", "y" and "z" are numbers greater than zero. The amine-containing compound can be selected from the group consisting of primary amines, secondary amines and tertiary amines.

34 Claims, 4 Drawing Sheets

SOUR-GAS SWEETENING SOLUTIONS AND METHODS

CROSS-REFERENCE TO RELATED APPLICATIONS

This application claims the benefit of U.S. provisional patent application 60/842,071, filed Sep. 1, 2006, which is incorporated herein by reference in its entirety.

BACKGROUND

The present invention relates generally to sour gas sweetening, and more particularly, to reducing the corrosion in process equipment associated with removal of $CO_2$ when small amounts of oxygen and hydrogen sulfide are present.

DESCRIPTION OF THE RELATED ART

The natural gas industry has long been interested in sulfur recovery technology for applications to gaseous streams resulting from the treatment of "sour" natural gas (also referred to as "sour gas" herein) resources to render them commercially useful. Many natural gas resources contain significant quantities of hydrogen sulfide ($H_2S$), carbon dioxide ($CO_2$) and other contaminants, including, for example, aromatic hydrocarbons, benzene, toluene, mixed xylenes, ethylbenzene, and the like, rendering them unsuitable for commercial use.

Sour gas can cause extensive damage to natural gas pipelines if not properly processed. The combustion of sulfur compounds produces serious air pollutants (e.g., $SO_2$, $SO_3$) and eventually produces acid rain when combined with water. These sulfur compounds are poisonous and lethal to humans and animals, and are corrosive to metals and other materials used for the handling and transporting natural gas.

In order to reduce health and environmental hazards, and to meet industry specifications, the $H_2S$ and $CO_2$ concentrations in sour gas are ordinarily reduced by regenerative gas-treatment systems. These systems typically contact a sour gas directed into an absorption tower ("absorber") with an absorption solution (also referred to herein as "sour gas sweetening solution") that removes hydrogen sulfide, carbon dioxide and other substances, such as light mercaptans, from the sour gas. The absorption solution is then regenerated and reused in the system. Recovered hydrogen sulfide is either burned off into the atmosphere or, more commonly, directed to a sulfur recovery plant, such as a Claus plant. The process of removing $H_2S$, $CO_2$, and other impurities is herein referred to as "sour gas sweetening." Exemplary references more particularly describing these matters include U.S. Pat. Nos. 4,009,251, 4,243,648 and 3,937,795, each of which is incorporated herein by reference in its entirety.

When natural gas is treated, most plants handling large volumes of sour gas containing greater than about 50 ppm hydrogen sulfide use amine-based technology for acid gas removal. Amines commonly used include, without limitation, mercaptamine, mono-ethanolamine (MEA), monomethyl methanolamine (MMEA), diethanolamine (DEA), di-isopropanolamine (DIPA), diglycolamine (DGA) and methyl diethanolamine (MDEA). The plants can remove both carbon dioxide and hydrogen sulfide. When the amine solution is spent, the acid gases are flashed off and the solution is regenerated.

Amine plants do not absorb methane or other hydrocarbons to any significant extent, so methane loss is not an issue. However, the hydrogen-sulfide-containing gas stream—produced when the absorbent is regenerated—must still be treated, subject to the same constraints as above.

A typical regenerative sour gas treatment plant (also referred to herein as "sour gas sweetening plant") utilizing an amine-based absorption solution is shown in FIG. 1. A stream of sour gas 10 is directed into an absorption tower ("absorber") 15 and is contacted with a stream of an absorption solution 20 in a counter flow fashion (i.e., the absorption solution flows in a direction counter to the flow of sour gas). The absorption solution removes $H_2S$ and $CO_2$ (in addition to other impurities) from the sour gas stream 10 and is directed out of the absorber in stream 25. The absorption solution containing $H_2S$ and $CO_2$ is herein referred to as a "rich" solution. The purified gas (or "sweetened sour gas"), comprising a lower concentration of impurities than the sour gas directed into the absorber 10, is directed out of the absorber 15 through stream 30.

With continued reference to FIG. 1, the rich solution is directed to a recovery system comprising a heating element 35 and a regenerator (or distillation column) 40, which comprises a reboiler 45, a condenser 50 and a reflux drum 55. The heating element 35 can be a heat exchanger, as shown in FIG. 1, or alternatively can be an independent reboiler. The recovery system removes impurities (e.g., $H_2S$, $CO_2$) from the rich solution, generating separate streams of acid gas and a relatively impurity-free absorption solution, which is also referred to herein as a "lean solution." The lean solution is directed to a solution filter 65 using a pump 60, and subsequently chilled using cooler 70 and directed into the absorber 15 for further sour gas treatment.

Absorption solutions typically used in the industry include aqueous solutions comprising primary, secondary and/or tertiary amines, such as, for example, monomethyl methanolamine (MMEA) and methyl diethanolamine (MDEA). Removal of $H_2S$ using an aqueous amine solution can be described through the following two-step process:

1) $H_2S$ (gas)$\rightarrow H_2S$ (soln) (very fast)
2) $H_2S$ (soln)+$R_2NH$ (soln)$\rightarrow R_2NH.H_2S$ (soln) (very fast)

With reference to step 2) above, "R" is a side group comprising an alkane, alkene, alkyne, alcohol, etc., and "soln" designates a species in an aqueous phase. The amine forms a complex ($R_2NH.H_2S$) with $H_2S$ dissolved in the absorption solution. The relative rates of reaction are indicated to the right of each reaction step.

$CO_2$ removal can be described through the following process, which forms a carbonate ($HCO_3$) in the third step:

1) $CO_2$ (gas)$\rightarrow CO_2$ (soln) (fast)
2) $CO_2$ (soln)+$H_2O \rightarrow H_2CO_3$ (soln) (slow)
3) $H_2CO_3$ (soln)+$R_2NH \rightarrow R_2NH_{2+}$ (soln)+$HCO_3$ (soln) (fast)

A problem with current sour gas treatment processes using amine-based absorption solutions is that mechanical equipment in an amine plant makes it susceptible to failure. A sour gas treatment plant utilizing an amine-based absorption solution typically includes one or more scrubbers, heaters, coolers, pumps, etc. (see FIG. 1), and requires frequent quality checks and maintenance, making operational reliability among the weakest features of the technology. In particular, a treatment solution contains components that can lead to corrosion, leading to equipment failure, plant downtime and significant processing costs. These components include the highly basic amine solution and the chemicals that are formed through reactions between the sulfur-containing compounds or other compounds (e.g., $H_2S$ and $CO_2$) in the source gas and the treatment solution. As an example, $CO_2$ in solution can form $HCO_3$, which can corrode the surfaces of metallic components (e.g., iron-containing surfaces) of the treatment plant. As another example, amine-based absorption solutions available in the art lead, for example, to corrosion of the interior of the absorber 15 of FIG. 1. Generally, corrosion is a problem wherever the absorption solution comes in contact with a processing unit made of metal, in particular when oxygen and small amounts of $H_2S$ are also present in the gas to be treated.

Another problem with current amine-based absorption systems is what is commonly referred to as "foaming." When gaseous and liquid phases are mixed, for example, in the absorber of a gas-treatment plant, some of the gas can be retained in the liquid phase, forming a stable emulsion or foam. The presence of solid corrosional products aggravates the foam problem. The presence of foam can lead to severe operating problems in sour gas treatment systems. Loss of scrubbing efficiency, solution losses due to carryover into the lean gas stream, fouling of downstream equipment and increased pressure drop across the absorber are some of the symptoms of foaming problems.

SUMMARY

In one embodiment, a sour gas sweetening solution is provided. The sour gas sweetening solution comprises an aqueous solution of a silicon-containing compound and an amine-containing compound. The concentration of the silicon-containing compound in the aqueous solution is less than or equal to about 500 parts per million ("ppm") calculated as $SiO_2$.

In another embodiment, an absorption solution for use in a sour gas treatment plant is provided. The absorption solution comprises an aqueous solution including $M_vH_wSi_yO_z$, wherein "M" is a metal, such as, e.g., sodium or potassium, "v", "y" and "z" are numbers greater than zero, and "w" is a number greater than or equal to zero, and an amine-containing compound. The concentration of $M_vH_wSi_yO_z$ in the aqueous solution is less than or equal to about 500 ppm as $SiO_2$.

In yet another embodiment, a method for sweetening sour gas is provided. The method comprises providing an absorption solution comprising a silicon-containing compound and an amine-containing compound, and contacting the absorption solution with the sour gas. The silicon-containing compound is provided at a concentration less than or equal to about 500 ppm as $SiO_2$.

In still another embodiment, a method of forming an absorbent solution for sweetening the sour gas and minimizing the corrosion of process equipment is provided. In some embodiments, the method comprises providing sodium hydroxide (NaOH) and silicon in a reaction container. Water is added to the reaction container to form a silicon-containing compound. The absorption solution is formed by combining the silicon-containing compound with an amine-containing compound in an aqueous solution. The silicon-containing compound in the aqueous solution is maintained at a concentration less than or equal to about 500 ppm. In other embodiments, the method comprises providing sodium hydroxide and, commercial water glass, nominally 7.9% $Na_2O$ 24.5% $SiO_2$, and water to a tank to form a lower molecular weight sodium silicate solution. The sodium silicate in an aqueous solution is added to an amine solution and the $SiO_2$ solution is maintained at a concentration less than or equal to about 500 ppm as $SiO_2$.

BRIEF DESCRIPTION OF THE DRAWINGS

The invention will be better understood from the Detailed Description of the Preferred Embodiments and from the appended drawings, which are meant to illustrate and not to limit the invention, and wherein.

Figure 1:
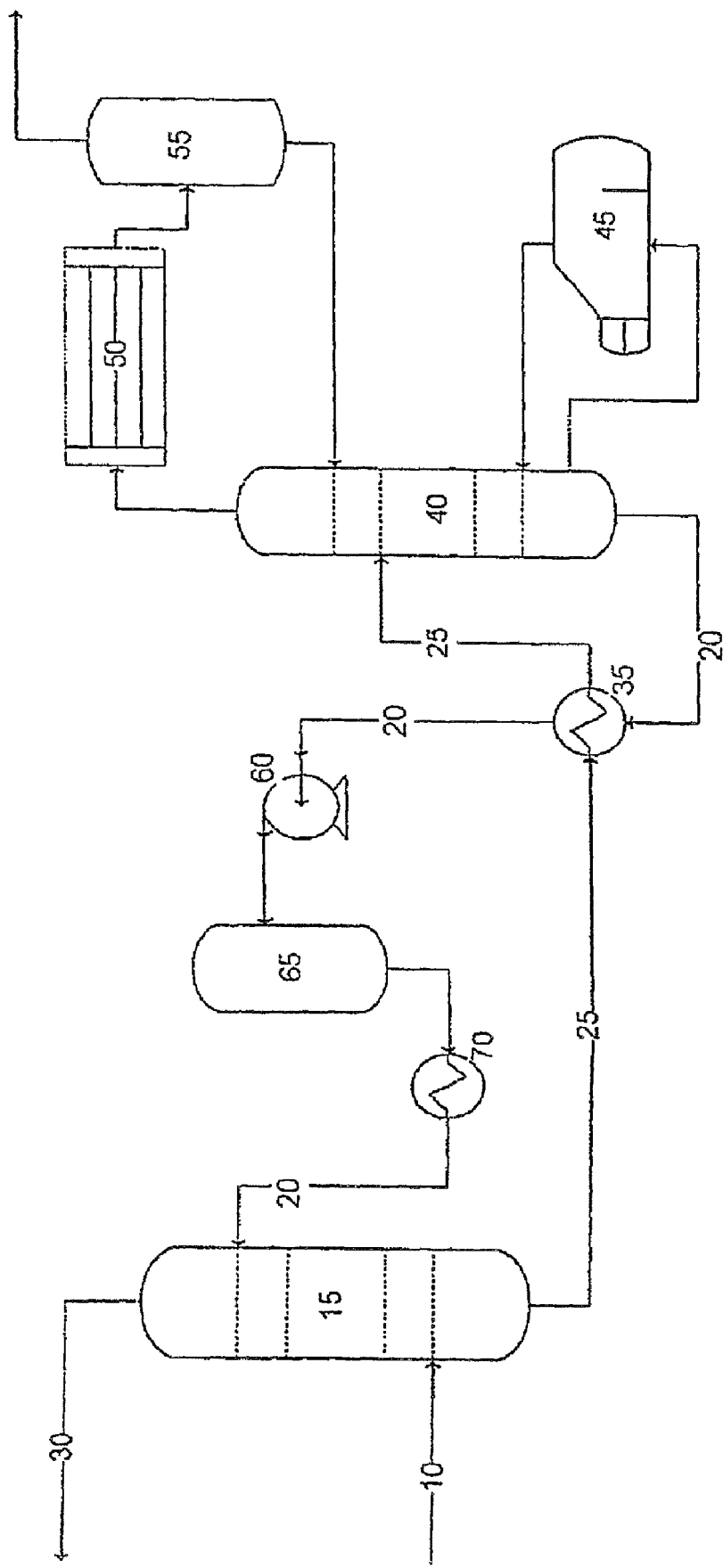
FIG. 1 is a schematic illustration of a sour gas sweetening facility.

It will be appreciated that the drawings and features therein are not drawn to scale.

DETAILED DESCRIPTION OF THE PREFERRED EMBODIMENTS

Corrosion of treatment plant components (e.g., absorber and regenerator surfaces) can lead to significant process inefficiencies and increases in capital costs. Accordingly, there is a need in the art for methods of reducing, even eliminating, corrosion of treatment plant surfaces (e.g., scrubber surfaces, distillation column surfaces), while removing $H_2S$, $CO_2$ and other impurities from a stream of sour gas.

Corrosion of metal-containing surfaces—such as iron-containing surfaces (also "ferrous metal-containing surfaces" herein)—by carbon dioxide is a recognized phenomenon. This type of corrosion is found to be a serious problem in sour gas treatment plants. $H_2S$ can also corrode metal-containing surfaces. A scrubber surface comprising iron can react with $CO_2$ to form various iron compounds that enter the aqueous phase, leading to corrosion of the scrubber wall and the regenerator wall. Methods that prevent the corrosion of sour gas treatment plant surfaces can significantly enhance sour gas sweetening efficiencies and prolong the life of sour gas treatment plant equipment.

Methods to prevent corrosion are available in the art. For example, U.S. Pat. No. 2,826,516 to Froning et al. ("Froning"), entitled "PROCESS FOR INHIBITING CORROSION BY CARBON DIOXIDE IN ALKYLOL AMINE SYSTEMS," which is entirely incorporated herein by reference, teaches a method for inhibiting corrosion of equipment used in the regeneration of alkylol amine in the presence of carbon dioxide by either adding a soluble compound of silica to alkylol amine solutions or by placing a compound containing silica in an appropriate part (regenerator tower or the reboiler) of the acid gas separation system. However, Froning's teachings do not apply to solutions containing hydrogen sulfide or mixtures of hydrogen sulfide and carbon dioxide when oxygen is also present.

In "Corrosion of Iron Equipment from Carbon Dioxide Absorption in Monoethanolamine," by Preda et al. ("Preda"), *Revista de Chimie* (1967), which is entirely incorporated herein by reference, addition of 0.25% sodium silicate (7.9% $Na_2O$ and 24.5% $SiO_2$) to a 15% monoethanolamine solution in the presence of $CO_2$ formed a precipitate ($SiO_2$) within the first hour of reaction, which disappeared, allegedly via $SiO_2$ deposition on steel sample surfaces. However, Preda does not recognize the benefits of using $SiO_2$ deposition to prevent corrosion in the presence of $H_2S$. Further, Preda states that the deposition of $SiO_2$ on heat exchanger tube surfaces is undesirable, presumably because of the insulating properties of $SiO_2$ decrease the efficacy of heat exchangers.

In "Protection of Equipment for Acidic Gas Scrubbing by Corrosion Inhibitors," by Bartonicek et al. ("Bartonicek"),

*Chemicky Prumysl* (1962), which is entirely incorporated herein by reference, water glass containing 7.9% $Na_2O$ and 24.5% $SiO_2$ was added to a 15% 2-aminoethanol solution to inhibit the corrosive loss of aluminum from scrubber surfaces. Bartonicek teaches that a protective layer of insoluble $[Al(OH)_3]_x[SiO_2]_y$ is formed on scrubber surfaces—even if the solution is saturated with $H_2S$—at an $SiO_3$ concentration above 0.05% (or 500 ppm). However, Bartonicek does not recognize the benefits of using a silicate protective layer on iron-containing surfaces.

U.S. Pat. No. 5,846,503 to Yan ("Yan"), entitled "PROCESS FOR REJUVENATING USED ALKANOLAMAINE [sic] SOLUTIONS," which is entirely incorporated herein by reference, teaches a method for rejuvenating an aqueous alkanolamine solution by contacting said aqueous alkanolamine solution with hydrogen in the presence of a hydrotreating catalyst. Hydrotreating catalysts of Yan include sulfides and oxides of groups IB, VIB and VIIIA metals, including bimetallic catalysts, or inert and catalytically active supports formed of alumina, silica, silica-alumina, zeolites, clays, titania, magnesia and active carbons. Yan does not teach or suggest using silicon-containing compounds for preventing corrosion of treatment plant surfaces.

In view of the limitations of prior art systems and methods, there is a need in the art for methods of sweetening sour gas while preventing the corrosion of sour gas treatment plant (also "treatment plant" herein) components.

Preferred embodiments of the present invention are based on new and unexpected results. The inventor has realized that combining a silicate-containing compound with an absorption solution (also referred to herein as "sour gas sweetening solution" or "sour gas treatment solution") containing an amine (e.g., primary, secondary and/or tertiary amine) and maintaining the concentration of the silicate-containing compound at a predetermined level, preferably lower than the concentration of the amine in solution, more preferably substantially lower than the concentration of the amine in solution, aids in preventing the corrosion of sour gas treatment plant equipment surfaces while removing impurities (e.g., $H_2S$, $CO_2$) from the sour gas. Preferred silicate-containing compound concentrations are sufficient to prevent corrosion, yet low enough to avoid problems associated with the deposition of silicon-containing compounds on, e.g., heat exchanger tube surfaces, which can lead to increased capital costs in view of decreased heat exchanger efficiencies.

It will be appreciated that "absorption solution" as used herein can include an amine, one or more silicon-containing compounds and, through various stages of the sour gas sweetening process, $H_2S$, $CO_2$ and species derived from $H_2S$ and $CO_2$. It will be appreciated that an absorption solution initially containing an amine, when combined with a silicon-containing compound, is also referred to as an absorption solution.

In some embodiments, the silicate contained in an amine absorption solution reacts to form a protective layer (also referred to as "passivating layer" herein) on sour gas treatment plant component surfaces during the sour gas sweetening process, thus aiding in reducing, even eliminating, the corrosion of treatment plant surfaces. In some embodiments, the passivating layer comprises an iron-silicate. In other embodiments, the passivating layer comprises silicon and a metal (e.g., Fe) found in a treatment plant component surface. In preferred embodiments, the passivating layer is $M_xH_ySiO_z$, wherein "M" is a metal (e.g., Fe) and "x", "y" and "z" are numbers greater than or equal to zero. As an example, the passivating layer may be a protective layer of iron and silicate, such as $Fe_2SiO_4$.

The thickness of the passivating layer is dependent on various factors, such as, for example, the concentration of silicon-containing compound in the absorption solution, the solution temperature and the solution pH. The passivating layer can have a thickness on the order of several nanometers or several micrometers. In preferred embodiments, the thickness of the passivating layer is selected in order to prevent corrosion of sour gas treatment plant equipment (also "component" herein) surfaces while not adversely affecting the sour gas sweetening process. When $H_2S$ and $O_2$ are present with $CO_2$ the corrosion problems become more complex and severe. Ferrous iron ($Fe^{2+}$) is rapidly oxidized to ferric iron ($Fe^{3+}$), which is a known catalyst for corrosion of dissolved $H_2S$ to elemental sulfur. The reactions are known as the iron redox system.

1. $H_2S \rightarrow HS^- + H^+$
2. $2Fe^{+3} + HS^- \rightarrow 2Fe^{+2} + S^0 + H^+$
3. $\frac{1}{2}O_2 + H^+ + 2Fe^{+2} \rightarrow 2Fe^{+3} + OH^-$
4. $OH^- + H^+ \rightarrow H_2O$
5. $H_2S + \frac{1}{2}O_2 \rightarrow S^0 + H_2O$ This loss of the sulfide ion from the $H_2S$ prevents the formation of fine grained ferrous sulfide that forms a protective and adherent coating which prevents further corrosion by $H_2S$. When oxygen is present in excess of that required to form elemental sulfur, other sulfur oxy anions are formed, such as thiosulfate, sulfite and sulfate. The amine sulfite and sulfate salts are aggressive corrosion agents at elevated temperatures to steel and pitting and corrosion can occur. The thiosulfate ion can be further oxidized to the sulfate ion when excess oxygen is present. It is known that water soluble silicates react to form a protective complex that stabilizes the ferric ion and prevents the iron redox sequence at the starting point. It is this combined formation of a protective silicate barrier and the formation of a ferric silicate complex that makes low molecular weight silicate as effective in preventing corrosion in amine based absorption systems that contain oxygen.

In a preferred embodiment, an absorption solution (or sour gas sweetening solution) comprising an amine (e.g., primary, secondary and/or tertiary amine) and a silicon-containing compound is provided. The silicon-containing compound is preferably provided at a concentration less than or equal to about 500 parts per million ("ppm") as $SiO_2$, More preferably less than or equal to about 400 ppm, and most preferably between about 50 and 300 ppm silicate. In preferred embodiments, the silicon-containing compound is $M_vH_wSi_yO_z$, wherein "M" is a metal, such as, e.g., Na or K, "v", "y" and "z" are numbers greater than zero, and "w" is a number greater than or equal to zero. In some embodiments, the silicon-containing compound is $M_2O(SiO_2)_x$, wherein "M" is a metal (e.g., Na, K, Cs) and "x" is a number greater than zero. As an example, the silicon-containing compound can be $Na_2SiO_3$ (sodium metasilicate). As another example, the silicon-containing compound can be $K_2Si_2O_5$ (potassium disilicate). It will be appreciated that $M_2O(SiO_2)_x$ dissociates in water into $M^+$ and $Si_xO_{2x+1}^{-2}$ ions. The $Si_xO_{2x+1}^{-2}$ ions can react with other species in solution (e.g., water) to form a variety of compounds, such as silicic acid.

In preferred embodiments, the silicon-containing compound in the absorption solution is maintained at a concentration less than or equal to about 500 parts per million ("ppm") silicate, more preferably less than or equal to about 400 ppm, and most preferably between about 50 ppm and 300 ppm silicate. This may be achieved by adding the silicon-containing compound to the absorption solution when the concentration drops below a predetermined level. The concentration of the silicon-containing compound can be measured, for example; using spectroscopy or by chemical means. In some embodiments, the concentration of the silicate-containing compound is measured by an operator. Method for analysis of soluble silicate can be found in *Standard Methods for Examination of Water and Waste Water*, Edited by Arnold E. Greenberg, Lenore S. Clescerf and Andrew D. Eaton. In other embodiments, the concentration of the silicon-containing compound is measured by a computer system, and/or in the laboratory and reported to the operator for suitable additions of more silicate solution.

In preferred embodiments, the silicon-containing compound is maintained at a predetermined concentration throughout the sour gas sweetening process. The predetermined concentration is preferably less than or equal to about 500 parts per million ("ppm"), preferably less than or equal to about 400 ppm, more preferably between about 50 ppm, 100 ppm, or 150 ppm, and 200 ppm, 250 ppm, or 300 ppm silicate.

In preferred embodiments, a method for sweetening sour gas comprises providing an aqueous absorption solution ("absorption solution" herein) including a silicate-containing compound and an amine-containing compound, and contacting sour gas with the absorption solution. In one embodiment, sour gas is directed through an absorber (such as absorber 10 of FIG. 1) and contacted with the absorption solution. The absorption solution is subsequently recovered using, for example, the recovery system described in FIG. 1.

The absorption solution removes most, preferably substantially all of the $H_2S$ and $CO_2$, (in addition to other impurities) from the sour gas while reducing, if not eliminating, foaming and corrosion of sour gas treatment plant (also "processing system" herein) components.

It will be appreciated that "amine" or "amine-containing compound" as used herein designates any primary, secondary or tertiary amine, and mixtures thereof. Primary, secondary and tertiary amines can be designated by $RH_2N$, $R_1R_2HN$ and $R_1R_2R_3N$, respectively, wherein $R_n$ (n=1, 2 or 3) is a side group, such as an organic side group (e.g., alkyl or alcohol side group). It will be appreciated that a secondary or tertiary amine need not have the same side groups, i.e., $R_1$, $R_2$, and $R_3$ (for a tertiary amine) need not be the same. A primary amine can include, without limitation, mercaptamine, mono-ethanolamine (MEA) and monomethyl methanolamine (MMEA). A secondary amine can include, without limitation, diethanolamine (DEA), di-isopropanolamine (DIPA) and diglycolamine (DGA). A tertiary amine can include, without limitation, methyl diethanolamine (MDEA).

It will be appreciated that "absorption efficiency" as used herein can be defined as moles of contaminants ($H_2S$, $CO_2$, etc) within a sour gas stream directed into an absorber ($C_{in}$) minus moles of contaminants within a sweetened sour gas stream leaving an absorber ($C_{out}$), all divided by $C_{in}$. If all contaminants are removed from the sour gas (i.e., $C_{out}$=0), then the absorption efficiency will be 1, in which case sour gas processing can be said to be 100% efficient.

It will be appreciated that "parts per million" ("ppm") as used herein denotes one unit of a given substance for every 999,999 other units.

"Corrosion" as used herein can denote the deterioration of essential properties of a material due to reaction with its surrounding. As an example, when a surface corrodes, material that forms the surface can leave the surface and enter the liquid. A surface can corrode when it comes in contact with a solution that includes species that are reactive with the surface. As an example, an iron-containing surface can corrode when iron in the surface reacts with a solution that comes in contact with the surface, and subsequently enters the solution phase.

Absorption Solution

Methods for forming an absorption solution according to preferred embodiments will now be described. The methods comprise combining a silicon-containing compound (either in solid or liquid form) with an amine-containing compound to form an aqueous solution having the silicon-containing compound and the amine-containing compound.

The concentration of the silicon-containing compound in the absorption solution is preferably less, more preferably substantially less than the concentration of the amine in the absorption solution. In one embodiment, the absorption solution comprises less than or equal to about 500 ppm silicon-containing compound (i.e., 500 parts silicon-containing compound per million parts of other species in solution, such as water and an amine). In another embodiment, the absorption solution comprises less than or equal to about 400 ppm silicon-containing compound. In yet another embodiment, the absorption solution comprises between about 50 ppm and 300 ppm silicon-containing compound.

In a first phase of preferred embodiments, a silicon-containing compound is provided. In preferred embodiments, the silicon-containing compound is $M_vH_wSi_yO_z$, wherein "M" is a metal, such as, e.g., Na or K, "v", "y" and "z" are numbers greater than zero, and "w" is a number greater than or equal to zero. In some embodiments, the silicon-containing compound is $M_2O(SiO_2)_x$ (also referred to herein as "water glass"), wherein "M" is a metal, such as, e.g., Na or K, and "x" is a number greater than zero. Water glass can be purchased from commercial vendors, such as, e.g., PQ Corporation, Valley Forge, Pa., or formed by combing silicon and sodium/potassium hydroxide solids in water according to the following formula, which has been generalized for forming any $M_2O(SiO_2)_x$:

$$2MOH(s) + (2x-1)H_2O(l) + xSi(s) \rightarrow M_2O(SiO_2)_x(s) + 2xH_2(g) \qquad (1)$$

In equation (1), "M" is a metal (e.g., Na, K), "x" is a number greater than zero, "s" designates a solid phase and "l" designates a liquid phase. For example, with "x"=1 and "M"=Na (sodium), the equation gives a formula to form sodium monosilicate:

$$2NaOH(s) + H_2O(l) + Si(s) \rightarrow Na_2SiO_3(s) + 2H_2(g) \qquad (2)$$

With an enthalpy of reaction of about −373 KJ per mole reaction, forming sodium monosilicate according to the equation above is exothermic. Thus, in preferred embodiments temperature control can be advisable to keep the solution temperature within desired limits, such as, for example, below 100° C. (or 212° F.) at 760 torr to prevent evaporative water loss. It will be appreciated that $Na_2SiO_3$ dissociates into $Na^+$ and $SiO_3^{2-}$ ions in water, with the extent of dissociation dictated by the solubility equilibrium constant ($K_{sp}$) of $Na_2SiO_3$. That is, in water, $Na_2SiO_3(s) \rightarrow 2Na^+(aq) + SiO_3^{2-}(aq)$, wherein "aq" designates that the particular anion or cation is in an aqueous phase.

As another example, with "x"=2, equation (1) gives a formula to form sodium disilicate:

$$2NaOH(s) + 3H_2O(l) + 2Si(s) \rightarrow Na_2Si_2O_5(s) + 4H_2(g) \qquad (3)$$

The enthalpy of reaction for forming sodium disilicate from sodium hydroxide and silicon (per the equation above) is about −1332 KJ per mole reaction—the reaction is exothermic. Accordingly, temperature control can be advisable to keep the solution temperature within desired limits. In one embodiment, temperature control is employed to keep the solution temperature preferably below 100° C. in order to prevent evaporative water loss during reaction.

In other embodiments, the silicon-containing compound is $MHSiO_3$, wherein "M" is a metal, such as, e.g., Na or K. As an example, with "M" equal to sodium, $NaHSiO_3$ is formed according to the following:

$$NaOH(s)+Si(s)+2H_2O(l) \rightarrow NaHSiO_3(a)+2H_2(g) \quad (4)$$

Temperature control can be advisable to keep the solution temperature within desired limits. In one embodiment, temperature control is employed to keep the solution temperature preferably below 100° C. in order to prevent evaporative water loss during reaction.

As another example, with "M" equal to potassium, $KHSiO_3$ is formed according to the following:

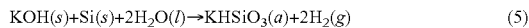

$$KOH(s)+Si(s)+2H_2O(l) \rightarrow KHSiO_3(a)+2H_2(g) \quad (5)$$

In some embodiments, the absorption solution comprises a mixture of silicon-containing compounds. As an example, the absorption solution can comprise $M^1{}_2O(SiO_2)_x$ and $M^2HSiO_3$, wherein "$M^1$" and "$M^2$" denote a first metal and a second metal. "$M^1$" and "$M^2$" can be the same metal (e.g., Na or K) or different metals (e.g., Na and K). As another example, the absorption solution compound can include $M^1{}_2SiO_3$ and $M^2{}_2Si_2O_5$. As still another example, the absorption solution can include $M^1{}_2SiO_3$ and $M^2HSiO_3$. As yet another example, the absorption solution can include $M^1{}_2Si_2O_5$ and $M^2HSiO_3$. As yet another example, the absorption solution can include $M^1{}_2SiO_3$, $M^2{}_2Si_2O_5$, $M^3HSiO_3$, wherein "$M^3$" is a third metal, such as, e.g., Na or K. In an exemplary embodiment, the silicon-containing compound is a mixture of $Na_2SiO_3$ and $NaHSiO_3$. In preferred embodiments, the proportion of silicon-containing compounds in the absorption solution is selected to maximize the efficiency of the sour gas sweetening process while minimizing the corrosion of treatment plant component surfaces.

It will be appreciated that the silicon-containing compounds can dissociate in solution and react with other species in solution (e.g., water) to form derivative species ("derivatives"). As an example, $NaHSiO_3$ can dissociate into $Na^+$ and $HSiO_3^-$, and $HSiO_3^-$ can react with $H_2O(l)$ to form $Si(OH)_4$. As another example, $Na_2SiO_3$ in solution can yield $Na^+$ and $SiO_3^{-2}$, and $SiO_3^{-2}$ can react with $H_2O(l)$ to yield $Si(OH)_4$. The skilled artisan will understand that other derivatives are possible.

In preferred embodiments, the Si solid used to form the silicon-containing compound can include impurities, such as, e.g., iron, aluminum and calcium impurities. For example, Si(s) can be silicon of grade 441, 411, 321 or 553, each with different levels of impurities as indicated by the numbers. The skilled artisan will understand that silicon 553, for example, designates silicon having a silicon content of about 98.7%, an iron content of about 0.5%, an aluminum content of about 0.5% and a calcium content of about 0.3%. It will be appreciated that the impurities in Si(s) are not necessarily limited to iron, aluminum and calcium. Accordingly, the $M_vH_wSi_yO_z$ (e.g., $M_2O(SiO_2)_x$, $MHSiO_3$) solids formed according to preferred methods can include various concentrations of impurities. For instance, the impurities can be trapped in various lattice sites of an $M_2O(SiO_2)_x$ crystal. If the $M_2O(SiO_2)_x$ is dissolved in water, the impurities can be included in the aqueous solution of the silicon-containing compound. The impurities can help mitigate corrosion and foaming in sour gas treatment facilities, in addition to improving absorption efficiencies.

In some embodiments, a silicon-containing compound with sodium to silicate molar ratios at or near one is preferred. In one embodiment, $NaHSiO_3$ is preferred over other commercially available water glass solution with a sodium to silicon ratio as low as 0.4. The lower sodium to silicon ratio solutions are polymeric, containing bridge silicon-oxygen-silicon bonds, and are known to deposit on heat transfer surfaces and can impact operations.

It will be appreciated that silicon-containing compounds of preferred embodiments can dissociate in an amine-containing absorption solution to form ions. As an example, $NaHSiO_3$ in solution (or the aqueous phase) can dissociate into $Na^+$ and $HSiO_3^-$ ions. The extent of dissociation can depend on various factors, such as, e.g., the solubility equilibrium constant ($K_{sp}$) of the silicon-containing compound, the temperature of the absorption solution and the pH of the absorption solution.

The ($HSO_3^-$) ion can react with water and a hydrogen ion to form silicic acid, $Si(OH)_4$

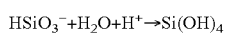

$$HSiO_3^- + H_2O + H^+ \rightarrow Si(OH)_4$$

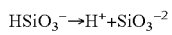

$$HSiO_3^- \rightarrow H^+ + SiO_3^{-2}$$

or further dissociate with the loss of a hydrogen ion to form $SiO_3^=$. It is known that a sodium silicate solution is a complex mixture of various silicate species, such as $Si(OH)_4$, $HSiO_3^-$, $SiO_3^{-2}$, $HSi_2O_5^{-1}$. In amine solutions with a basic pH from 9 to 11, the dominant species are $Si(OH)_4$, $HSiO_3^-$, and $HSi_2O_5^-$, with lesser amounts of $SiO_3^{-2}$.

A method for forming a silicon-containing compound (i.e., $M_vH_wSi_yO_z$) will now be described. While the method below is described for forming $NaHSiO_3$, it will be appreciated that the method can be applied to form any $M_vH_wSi_yO_z$, wherein "M" is a metal, such as, e.g., Na or K, "v", "y" and "z" are numbers greater than zero, and "w" is a number greater than or equal to zero. As an example, the method can be applied to form $Na_2Si_2O_5$. As another example, the method can also be applied to form a mixture of $NaHSiO_3$ and $Na_2SiO_3$ by varying the amount of sodium hydroxide added to the water glass solution.

It will be appreciated that the masses and volumes provided herein are for the sake of example only, and that the proportions of masses and volumes can be scaled accordingly to achieve a desired sodium silicate volume and concentration, such as for large-scale industrial operations.

Reference will now be made to the figures. It will be appreciated that the figures and features therein are not necessarily drawn to scale.

Figure 2:
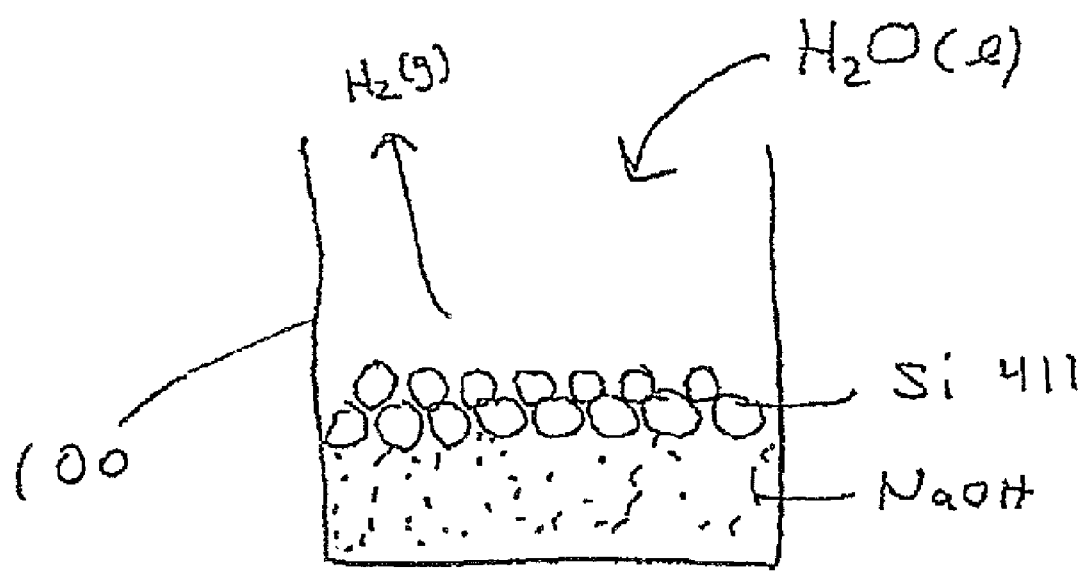
FIG. 2 is a schematic illustration of a method for forming a sodium monosilicate solution, according to some embodiments.

With reference to FIG. 2, in a first step of methods according to preferred embodiments, 1 mole (about 40 grams) of sodium hydroxide and 1 mole (about 28 grams) of Si 553 (both in solid form) are provided in a reaction container 100 (e.g., beaker, flask, drum, etc.). The skilled artisan will appreciate that Si 553 comprises iron, aluminum and calcium impurities. In some embodiments, the silicon can be crushed (or milled) into pieces of predetermined sizes before being added to the reaction container 100. The reaction container is preferably equipped with a thermometer or thermocouple for measuring the solution temperature during reaction. Additionally, the reaction container is preferably provided with a means of controlling the reaction temperature, such as a heat exchanger or a conductive heater. The reaction container can also be provided with a means of measuring solution specific gravity and conductivity. A control system (e.g., computer system) can be provided to monitor and maintain the reaction temperature at a predetermined value. In addition, the control system can be programmed to control the solution pH, specific gravity and conductivity by adjusting by mass or volume the amounts of ingredients used to form $NaHSiO_3$.

With continued reference to FIG. 2, in a second step, at least about two moles (or 36 milliliters, ml) of water is added to the reaction container having sodium hydroxide and silicon solids therein. The solution is concurrently mixed and the solution temperature is Monitored during reaction to provide sufficient mixing of reaction components and to ensure that the solution temperature does not exceed desired (or predetermined) limits, such as, e.g., 100° C. Since there will be water loss as the solution temperature increases during reaction (due to an increase in the vapor pressure of water at higher temperatures), water can be periodically or continuously added to the reaction container to ensure that the reaction (see equation (4) above) reaches completion. Using about 40 g NaOH and about 28 g Si, about 100 g of $NaHSiO_3$ will be formed. Additionally, because silicon 553 was used, the resulting $NaHSiO_3$ can comprise, within its crystal structure (if in solid form), one or more of the following: Fe, Al and Ca. If $NaHSiO_3$ is prepared in liquid form, the $NaHSiO_3$-containing solution can include Fe impurities (in addition to other impurities, such as, e.g., aluminum and calcium).

In one embodiment, the solution temperature during reaction is maintained below 100° C. (at a pressure of 760 torr). In another embodiment, the solution temperature during reaction is maintained below 80° C. at 760 torr. The reaction container is preferably provided with a means of mixing contents therein. Since the reaction will emit hydrogen gas, the reaction container is also provided with a means for removing and/or collecting hydrogen, such as a purge line to a secondary container or an exhaust line to emit $H_2$ preferably into a controlled environment. Because the reaction between $H_2$ and $O_2$ is exothermic, care is preferably taken to prevent substantial quantities of $H_2$ from reacting with $O_2$.

In one embodiment, prior to adding water to the NaOH and Si mixture, the reaction container is sealed and the area on top of the solids is purged with an inert gas (e.g., He, Ar, $N_2$) to remove air, thus reducing the risk of hydrogen reacting with $O_2$. Solution volume and temperature can be monitored at least until the reaction reaches completion. It will be appreciated that the time to reach completion can vary depending on various factors, such as, e.g., mixing, solution volume and solution temperature during reaction. In one embodiment, the time to reach completion is less than or equal to about 24 hours. In another embodiment, the time to reach completion is less than or equal to about 12 hours. In yet another embodiment, the time to reach completion is less than or equal to about 6 hours. In still another embodiment, the time to reach completion is less than or equal to about 3 hours.

If the $NaHSiO_3$ is to be provided in solution form, the amount of NaOH and water used can be adjusted to provide a solution with a desired pH. In some embodiments, the solution is neutral (i.e., pH~7). In other embodiments, the solution is basic (i.e., pH>7). In one embodiment, the solution pH is greater than or equal to about 8. In another embodiment, the solution pH is greater than or equal to about 10. In yet another embodiment, the solution pH is greater than or equal to about 12. In still another embodiment, the solution pH is about 14. The solution pH can be adjusted by controlling the amounts of NaOH and $H_2O$ relative to the amount of Si. If a basic solution is desired, NaOH in excess of what is dictated by the stoichiometry of equation (4) above can be used. In the present example, NaOH in excess of 40 grams (with Si fixed at 28 grams) and water in excess of 36 ml will yield a basic solution, as the resulting sodium monosilicate solution will include excess hydroxide ions ($OH^-$). As an example, with 160 grams of NaOH and 28 grams Si, 120 grams of NaOH will remain unreacted. Dissolving the excess NaOH and $NaHSiO_3$ in 100 liters of water, for example, will yield a solution with a pH of about 12.5.

It will be appreciated that alternative methods for forming $NaHSiO_3$ are possible. As an example, rather than separately providing solid NaOH and Si in a container and adding water, Si can be added to an aqueous NaOH solution, or prepared by high temperature reaction of sodium carbonate with silica.

In a first step of methods according to the preferred embodiments is the formation of an aqueous solution of $NaHSiO_3$. Add 6.32 grams of NaOH (0.147 moles) to 100 grams of water glass containing 0.254 moles of sodium ion and 0.401 moles of $SiO_2$. This is added along with sufficient water, approximately 132 grams, to produce a $NaHSiO_3$ solution that contains equal molar amounts of sodium ion and $SiO_2$, and has a solution density of 1.2 grams/cm$^3$. The solution is allowed to cool with stirring until a final pH of 12.4 at 25° C. is obtained. This solution is allowed to sit for 24 hours before addition to the amine solution at a concentration of 500 parts silicate per million parts amine solution.

Suitable solutions of low molecular weight-water soluble metal silicate ion can be prepared by other routes. For example, sodium metasilicate can be prepared from a solution of sodium hydroxide and silica metal as depicted by the equation below:

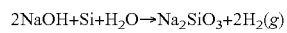

$$2NaOH + Si + H_2O \rightarrow Na_2SiO_3 + 2H_2(g)$$

By changing the rates of reactions, sodium metabisilicate can be prepared as indicated below:

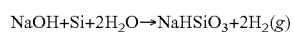

$$NaOH + Si + 2H_2O \rightarrow NaHSiO_3 + 2H_2(g)$$

Both reactions are slow, particularly the formation of the metabisilicate, and the time to reach completion can be excessive. Moreover, hydrogen gas is formed and care must be exercised to prevent the formation of hydrogen air mixtures during reaction.

In a second phase according to preferred embodiments, the silicate-containing compound provided in the first phase is added to an amine-containing solution to form the absorption solution. The silicate-containing compound preferably completely dissolves in the amine-containing solution. In one embodiment, the amine-containing solution comprises a primary amine. In another embodiment, the amine-containing solution comprises a secondary amine. In yet another embodiment, the amine-containing solution comprises a tertiary amine. In still another embodiment, the amine-containing solution comprises a mixture of two or more of primary, secondary and/or tertiary amines. The silicon-containing compound can be added to the amine-containing solution in a proportion selected to optimize the absorption efficiency of the absorption solution while eliminating foaming of the absorption solution and corrosion of downstream processing equipment.

In one embodiment, a given mass of a silicon-containing compound, (e.g., sodium metasilicate, sodium disilicate) is added to a predetermined volume of a solution comprising an amine-containing compound, such as, for example, DEA, to form an absorption solution comprising the silicon-containing compound and the amine-containing compound. Preferably, the mass of the silicon-containing compound and the volume of the solution comprising the amine-containing compound are selected such that the silicon-containing compound completely dissolves in solution. Because the silicon used to form the silicon-containing compound can include iron, aluminum and calcium impurities (see above), the absorption solution can include certain concentrations of iron, aluminum and calcium. These concentrations are dependent, at least in part, on the grade of silicon used and the volume of the solution comprising the amine-containing compound.

In another embodiment, a given volume of a solution comprising a silicon-containing compound, the solution comprising a desired concentration of the silicon-containing compound, is added to a predetermined volume of a solution comprising an amine-containing compound to form an absorption solution comprising the silicon-containing compound and the amine-containing compound. The volume of the solution comprising the silicon-containing compound and the volume of the solution comprising the amine-containing compound are selected such that the absorption solution has silicon-containing compound and amine-containing compound concentrations as desired. As above, the absorption solution can include iron, aluminum and calcium, which can be introduced as impurities in the Si(s) used to form the silicon-containing compound. The concentrations of iron, aluminum and calcium are dependent, at least in part, on the grade of silicon used and the volume of the solution comprising the silicon-containing compound combined with the volume of the solution comprising the amine-containing compound.

In some embodiments, a silicate-containing compound (e.g., $NaHSiO_3$, $KHSiO_3$, $Na_2SiO_3$, $Na_2Si_2O_5$, etc.), whether in solid or aqueous form, is combined with a solution comprising an amine-containing compound (also referred to as "amine solution" herein) to form an absorption solution having a silicate-containing compound content (or concentration) preferably less than or equal to about 500 ppm, more preferably less than or equal to about 400 ppm, and most preferably between about 100 ppm and 300 ppm as $SiO_2$. The skilled artisan will appreciate that the desired silicate content can be selected based, for example, on the amount of silicon-containing compound dissolved in the amine solution.

It will be appreciated that solution parameters can be adjusted to optimize the absorption of $CO_2$ and $H_2S$ (in addition to any other impurities included in the sour gas) in a sour gas facility utilizing the absorption solution of preferred embodiments. It will be further appreciated that solution parameters can be adjusted to minimize the corrosion of equipment surfaces within a sour gas facility utilizing the absorption solution of preferred embodiments. Solution parameters can include, without limitation, solution pH, solution specific gravity, silicon-containing compound concentration and amine-containing compound concentration.

Thus, an absorption solution according to preferred embodiments is provided. The absorption solution can be used in conventional sour gas treatment facilities to sweeten sour gas.

EXAMPLES

Example 1

Figure 3:
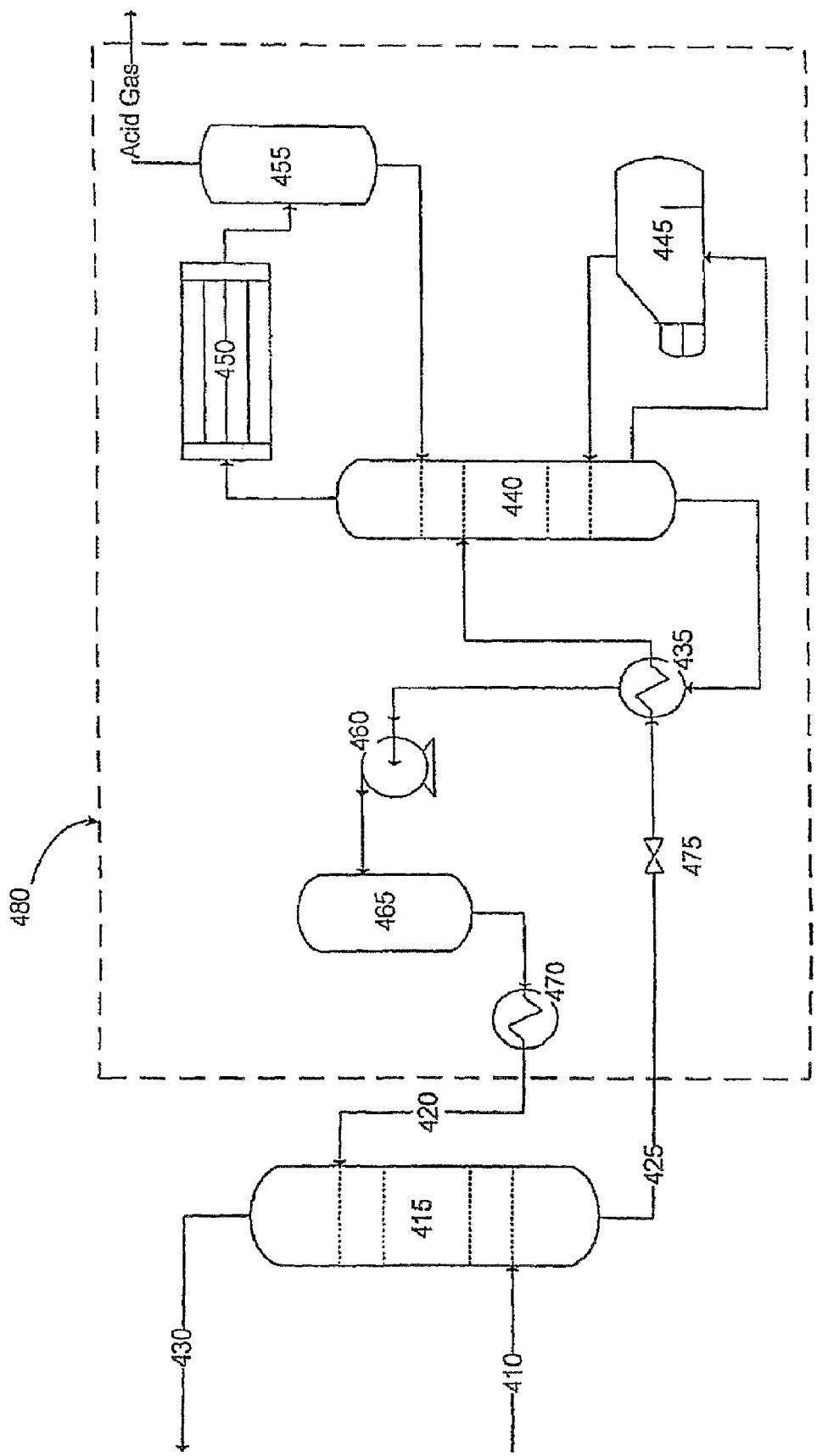
FIG. 3 is a schematic illustration of a method for sweetening sour gas using an absorption solution formed according to some embodiments.

As illustrated in FIG. 3, the absorption solution disclosed herein is used to treat a sour gas feed stream 410 containing 5 mole % $H_2S$, 5 mole % $CO_2$, and 90% natural gas. The natural gas component generally substantially contains methane, however, other gasses including but not limited to ethane, propane, butane, and pentanes can be present. Other impurities, such as nitrogen, water vapor, and/or helium can also be present. In this example, the natural gas contains approximately 1 mole % $N_2$, 83 mole % methane, 4 mole % ethane, 1 mole % propane, 0.4 mole % butane, and 0.6 mole % water.

The amine solution comprises approximately 28% DEA in water. A silicon-containing compound, $NaHSiO_3$, is combined with the amine solution to form an absorption solution 420 with a $NaHSiO_3$ content (concentration) of approximately 400 ppm total silicon dioxide.

The sour gas 410 and lean absorption solution 420 enter the absorption tower 415, which is approximately 3.5 feet in diameter, operates at 1000 psia (pounds per square inch, absolute pressure) and consists of twenty trays. The sour gas 410 enters the absorption tower 415 at approximately 86° F. and at a molar flow rate of approximately 25 million standard cubic feet per day (MMSCFD). The lean absorption solution 420 is circulated at a flow rate of approximately 190 U.S. gallons per minute (USGPM) and enters the absorption tower 415 at approximately 95° F. The pressure drop through the absorption tower 415 is approximately 5 psia. The temperature at the bottom of the tower 415 is approximately 160° F., while the temperature at the top of the tower 415 is approximately 100° F.

The rich absorption solution 425 exits the absorption tower 415 and is directed to the absorption solution regeneration system 480. The rich absorption solution 425 passes through a valve 475, reducing the pressure of the stream to 90 psia, which is approximately the operating pressure of the distillation column 440. The rich absorption solution 425 is then heated to a temperature of approximately 200° F. when it is passed through a heat exchanger 435 with the lean absorption solution 420, which exits the distillation column 440 at a temperature of approximately 255° F. The lean absorption solution 420 undergoes further cooling, and is then directed back to the absorption tower 415. The acid gas generated in the distillation column 440 is directed to a sulfur recovery unit (not shown), where the $H_2S$ is converted to elemental sulfur. As shown in FIG. 3, the acid gas can be passed through a condenser 450 and/or a separation unit 455, prior to being directed to the sulfur recovery unit. In addition, a reflux stream can also be used to increase the separation in the column 440, as shown.

The industry standard for "pipeline quality" gas requires that the sweet gas contain no more than 2.0% $CO_2$ and 4 ppm (by volume) $H_2S$. The sweet gas produced in the example above meets this standard, as virtually all of the $H_2S$ and most of the $CO_2$ is removed from the gas stream. That is, the sweet gas produced in the example above contains less than 2.0% $CO_2$ and less than 4 ppm $H_2S$. Importantly, these contaminants are removed with significantly less corrosion to the equipment surfaces. Decreased corrosion results in decreased "down time" for the facility for maintenance. The treatment plant used to produce the sweet gas in the example above was substantially free of corrosion after an extended period of use.

As those of ordinary skill in the art will appreciate, other parameters can be set as needed in order to operate the process. For example, the reboiler duty, reflux ratio, and acid gas production can be adjusted as conditions dictate. Pressure drops across equipment, residence times in the heat exchangers, and power inputs can also be determined based upon conditions of the system. Those of skill in the art can readily determine such parameters.

In addition, various additional components can be incorporated into the process. For example, the rich absorption solution can pass through a flash tank immediately following its exit from the absorption tower. Additional heat exchangers, columns, valves, pumps, etc. can also be used. In addition, the sizes and operating parameters of the columns can be varied. Furthermore, a makeup water stream can be added as water may be lost during the process.

The choice of amine solution can also significantly affect the above-described example. As will be appreciated by those of skill in the art, various concentrations of the amine solution can be used. For example, where MEA is used, the solution typically contains 15-35 weight percent ("wt %") amine in water. For DEA, this range is typically 25-35 wt %, and for MDEA, the range is typically 35-50 wt %. However, the preferred embodiments described herein are not limited to these ranges.

Those of skill in the art will appreciate that the absorption solution disclosed herein can be used in treating sour gas of varying compositions. The compositions described herein are exemplary only, as it is well understood in the art that the $CO_2$ and $H_2S$ concentration in the sour gas will vary significantly depending on the location of the natural gas reserve. Additionally, those of skill in the art will understand that sour gas can include additional impurities not described herein.

It will be appreciated that the silicate-containing compound in the absorption solution can react with the surfaces of sour gas treatment plant equipment (e.g., surfaces of the absorption tower 415 that come in contact with the absorption solution 420). If the concentration of the silicon-containing compound is maintained preferably below 500 ppm, more preferably below 400 ppm, and most preferably between about 50 and 300 ppm as $SiO_2$, the silicate-containing compound and/or its derivatives can react with the surfaces of the sour gas treatment plant equipment to form a protective coating that prevents corrosion. As an example, if the absorption tower 415 is formed of a material that includes iron, with the iron coordinated to one or more oxygen atoms (i.e., —Fe—O—) and the absorption solution 420 comprises $Si(OH)_4$ (formed when the $HSiO_3^-$ reacts with $H_2O$ in solution, for example), $Si(OH)_4$ can react with –Fe—O— to form surface layers comprising iron, silicon and oxygen (i.e., an iron, silicon and oxygen-containing layer). The iron, silicon and oxygen-containing layer can protect the surfaces of the absorption tower 415 from corroding when they come in contact with the absorption solution 420.

Example 2

The absorption solution described herein can also be used to remove $H_2S$ present in gases other than sour natural gas. In fact, the absorption solution disclosed herein can be used in any industry in which amine-based sulfur extraction is appropriate. For example, the silicon-containing amine solution (absorption solution) disclosed herein is used to extract $H_2S$ from synthesis gas, or "syngas." Syngas results from the gasification of solid organic-based products, including coal and petroleum coke. As these feed materials often contain significant amounts of sulfur, $H_2S$ is a common product of the gasification process. As a result, amine-based sulfur recovery techniques are often employed. Accordingly, use of the absorption solution disclosed herein can provide for enhanced sulfur recovery and can also decrease the maintenance costs and capital costs that result from corrosion and foaming problems.

Example 3

Figure 4:
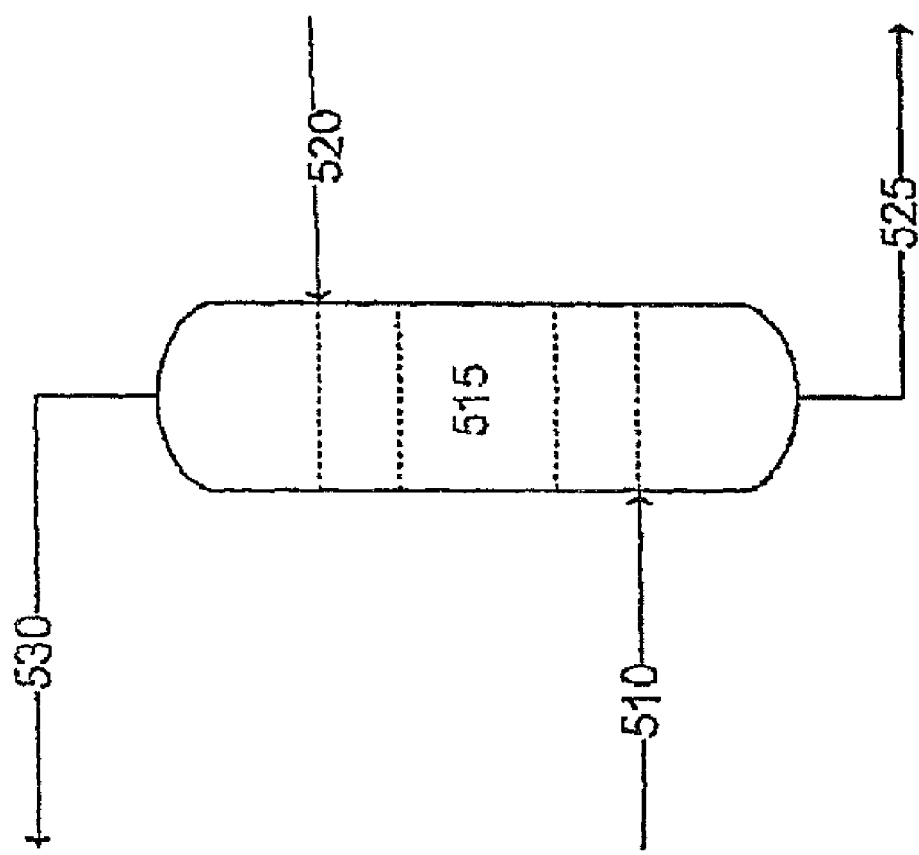
FIG. 4 is a schematic illustration of a method for sweetening sour gas using an absorption solution formed according to some embodiments.

With reference to FIG. 4, the absorption solution 520 comprising a silicon-containing compound and an amine-containing compound is directed into an absorber 515. The absorption solution 520 contacts the sour gas 510 in the absorber 515 and removes the $H_2S$ from the sour gas 510. The absorption solution 520 can also remove $CO_2$. As those of skill in the art will appreciate, the selectivity of the absorption solution 520 will vary depending upon several factors, including the type of amine-containing compound used in the absorption solution. That is, the amine-containing compound can be chosen to absorb greater or lesser amounts of $H_2S$ and/or $CO_2$.

The rich solution (i.e., absorption solution comprising $H_2S$ and/or $CO_2$, in addition to other impurities removed from the sour gas) 525 is then directed to an absorption solution regeneration system (see FIG. 4). The sweetened gas 530 is directed to a storage unit, for example. In some embodiments, a fraction of the sweetened gas 530 is recycled back into the absorber 515 for further sweetening. Those of skill in the art will appreciate that additional recycling streams can be included in the process.

The absorption solution formed according to preferred embodiments offers enhanced absorption efficiencies over methods currently available in the art, while eliminating corrosion of treatment plant equipment surfaces and problems associated with foaming.

It will be appreciated by those skilled in the art that various other omissions, additions and modifications can be made to the methods and compositions described above without departing from the scope of the invention. All such modifications and changes are intended to fall within the scope of the invention, as defined by the appended claims.

What is claimed is:

1. A sour gas sweetening solution, comprising an aqueous solution of a silicon-containing compound and an amine-containing compound, wherein the concentration of the silicon-containing compound in the aqueous solution is less than or equal to about 500 parts per million (ppm) as $SiO_2$.

2. The sour gas sweetening solution of claim 1, wherein the concentration of the silicon-containing compound in the aqueous solution is less than or equal to about 400 ppm as $SiO_2$.

3. The sour gas sweetening solution of claim 2, wherein the concentration of the silicon-containing compound in the aqueous solution is between about 100 ppm and 300 ppm as $SiO_2$.

4. The sour gas sweetening solution of claim 1, wherein the silicon-containing compound is $M_vH_wSi_yO_z$, wherein "M" is a metal, "v", "y" and "z" are numbers greater than zero, and "w" is a number greater than or equal to zero.

5. The sour gas sweetening solution of claim 4, wherein the silicon-containing compound is $NaHSiO_3$.

6. The sour gas sweetening solution of claim 4, wherein the silicon-containing compound is $KHSiO_3$.

7. The sour gas sweetening solution of claim 1, wherein the silicon-containing compound is $M_2O(SiO_2)_x$, wherein "M" is a metal and "x" is a number greater than zero.

8. The sour gas sweetening solution of claim 7, wherein the silicon-containing compound is $Na_2SiO_3$.

9. The sour gas sweetening solution of claim 7, wherein the silicon-containing compound is $Na_2Si_2O_5$.

10. The sour gas sweetening solution of claim 7, wherein the silicon-containing compound is $K_2SiO_3$.

11. The sour gas sweetening solution of claim 7, wherein the silicon-containing compound is $K_2SiO_5$.

12. The sour gas sweetening solution of claim 1, wherein the amine-containing compound is a primary amine.

13. The sour gas sweetening solution of claim 1, wherein the amine-containing compound is a secondary amine.

14. The sour gas sweetening solution of claim 1, wherein the amine-containing compound is a tertiary amine.

15. The sour gas sweetening solution of claim 1, wherein the amine-containing compound includes two or more of a primary amine, a secondary amine and a tertiary amine.

16. An absorption solution for use in a sour gas treatment plant, comprising an aqueous solution including $M_vH_wSi_yO_z$, wherein "M" is a metal, "v", "y" and "z" are numbers greater than zero, and "w" is a number greater than or equal to zero, and an amine-containing compound, wherein the concentration of $M_vH_wSi_yO_z$, in the aqueous solution is less than or equal to about 500 parts per million (ppm) as $SiO_2$.

17. The absorption solution of claim 16, wherein "M" is sodium or potassium.

18. The absorption solution of claim 16, wherein $M_vH_wSi_yO_z$, is $MHSiO_3$.

19. A method for sweetening sour gas, comprising:
providing an absorption solution comprising a silicon-containing compound and an amine-containing compound, wherein the silicon-containing compound is provided at a concentration less than or equal to about 500 parts per million (ppm) as $SiO_2$; and
contacting the absorption solution with the sour gas.

20. The method of claim 19, wherein the silicon-containing compound is provided at a concentration less than or equal to about 400 ppm.

21. The method of claim 20, wherein the silicon-containing compound is provided at a concentration between about 100 ppm and 300 ppm as $SiO_2$.

22. The method of claim 19, wherein providing an absorption solution comprises providing an absorption solution comprising $M_vH_wSi_yO_z$, wherein "M" is a metal, "v", "y" and "z" are numbers greater than zero, and "w" is a number greater than or equal to zero.

23. The method of claim 19, wherein providing an absorption solution comprises providing an absorption solution comprising $M_2O(SiO_2)_x$, wherein "M" is a metal and "x" is a number greater than zero.

24. The method of claim 19, wherein-providing an absorption solution comprises providing an absorption solution comprising $MHSiO_3$, wherein "M" is a metal.

25. The method of claim 19, wherein providing an absorption solution comprises providing an amine-containing compound comprising one or more of a primary amine, a secondary amine and a tertiary amine.

26. The method for forming an absorption solution for sweetening sour gas, comprising:

a. providing sodium hydroxide (NaOH) and silicon in a reaction container;
b. adding water to the reaction container to form a silicon-containing compound; and
c. forming the absorption solution by combining the silicate-containing compound with an amine-containing compound in an aqueous solution, wherein the silicon-containing compound in the aqueous solution is maintained at a concentration less than or equal to about 500 parts per million (ppm) as $SiO_2$.

27. The method of claim 26 wherein providing silicon comprises providing solid silicon selected from the group consisting of silicon 441, 411, 321 and 553.

28. The method of claim 26 wherein adding water comprises maintaining a solution temperature below about 100° C.

29. The method of claim 26, wherein forming the silicon-containing compound comprises forming $M_vH_wSi_yO_z$, wherein "M" is a metal, "v", "y" and "z" are numbers greater than zero, and "w" is a number greater than or equal to zero.

30. The method of claim 26, wherein forming the silicon-containing compound comprises forming $MHSiO_3$, wherein "M" is a metal.

31. The method of claim 26, wherein forming the silicon-containing compound comprises forming $M_2O(SiO_2)_x$, wherein "M" is a metal and "x" is a number greater than zero.

32. The method of claim 26, wherein forming the silicon-containing compound comprises combining the silicon-containing compound with an amine-containing compound selected from the group consisting of primary amines, secondary amines and tertiary amines.

33. The method of claim 26, wherein forming the silicon-containing compound in the aqueous solution is maintained at a concentration less than or equal to about 400 ppm.

34. The method of claim 33, wherein forming the silicon-containing compound in the aqueous solution is maintained at a concentration between about 100 ppm and 300 ppm as $SiO_2$.

* * * * *